United States Patent [19]

Goldstein

[11] Patent Number: 4,587,588

[45] Date of Patent: May 6, 1986

[54] POWER LINE TRANSIENT SURGE SUPPRESSOR

[75] Inventor: Richard Goldstein, Northbrook, Ill.

[73] Assignee: Perma Power Electronics, Inc., Chicago, Ill.

[21] Appl. No.: 585,853

[22] Filed: Mar. 2, 1984

[51] Int. Cl.⁴ ............................................. H02H 9/00
[52] U.S. Cl. ........................................ 361/54; 361/55; 361/56; 361/58; 361/91; 361/104; 361/110; 361/111; 337/17; 337/32
[58] Field of Search ........................ 361/55, 56, 54, 91, 361/111, 110, 58, 104, 118, 119, 127; 337/15, 17, 20, 28, 31, 32, 34

[56] References Cited

U.S. PATENT DOCUMENTS

| | | | |
|---|---|---|---|
| 4,023,071 | 5/1977 | Fussell | 361/56 |
| 4,068,277 | 1/1978 | Simokat | 361/55 |
| 4,068,279 | 1/1978 | Byrnes | 361/56 |
| 4,089,032 | 5/1978 | Orfano | 361/56 |
| 4,168,514 | 9/1979 | Howell | 361/56 |
| 4,191,985 | 3/1980 | Phillips, Jr. | 361/56 |
| 4,271,446 | 6/1981 | Comstock | 361/56 |

FOREIGN PATENT DOCUMENTS 1485679 9/1977 United Kingdom ................ 361/55

*Primary Examiner*—G. P. Tolin
*Assistant Examiner*—Derek S. Jennings
*Attorney, Agent, or Firm*—Stephen R. Arnold; Russell E. Hattis

[57] ABSTRACT

A power line transient surge suppressor circuit features a nonlinear surge-bypassing network connected to bypass line surges around electrical loads connected to circuit output terminals. A fuse is inserted in series with the network, and blows in the event of short-circuit failure of a regulator device in the network. A thermal cut-out preferably of the irreversibly actuated type is inserted in series with the suppressor circuit input. A current-limiting heater resistor connected in parallel with the fuse supplies heat to trip the cut-out after the fuse blows, thereby permanently terminating power output to the loads. A similar suppression network is provided for the earth lead in three-wire systems.

24 Claims, 1 Drawing Figure

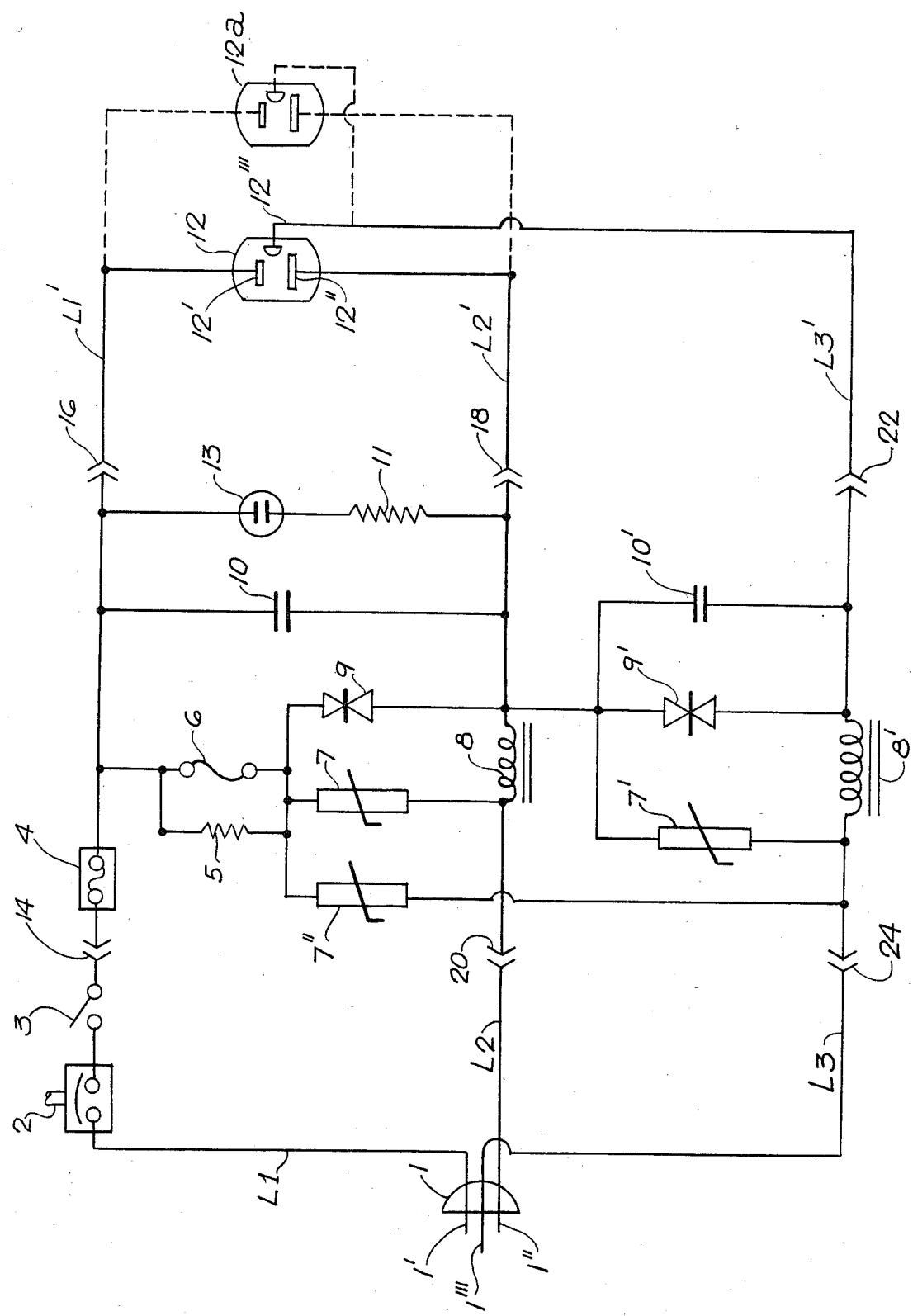

POWER LINE TRANSIENT SURGE SUPPRESSOR

TECHNICAL FIELD OF THE INVENTION

The technical field of the invention is surge suppressor systems for removing transients from electrical power distribution systems, in particular small systems which can be plugged into electrical power mains to deliver substantially surge free mains power to the output terminals thereof.

BACKGROUND OF THE INVENTION

The rapid proliferation of microprocessor-based electronic office equipment and small computers for the home and office has created a need for means to suppress power line voltage "spikes" or transient surges which can cause data errors and even permanent damage to such equipment. These transient surges are caused most frequently by nearby lightning strikes and by the switching of inductive load equipment which is connected to the same local a.c. power distribution branch or circuit. Unfortunately, a large amount of equipment in the field today has inadequate built-in transient surge suppression circuitry.

As a consequence of the poor power line transient surge immunity of such equipment, a market has developed for "power line conditioning" apparatus which can be inserted between the user's equipment and the power outlet where it is normally plugged in. One popular type of low cost surge suppressor incorporates surge suppression devices in a power outlet strip with multiple sockets. In this way a single wall outlet can be used to supply power to a number of devices which normally work together in a typical work station including items such as a personal computer, cathode ray tube display, printer, telephone modem, etc.. All of such equipment can be susceptible to disturbances from power line transients, so that devices which can protect them and provide a convenient power source at the same time have become quite commonly employed.

In addition to the transient surge suppression devices incorporated into these multiple outlet strip units, they generally also contain a circuit breaker to prevent overloading the branch circuit breaker and also to shutdown the power in the event of catastrophic equipment failure. A manual on-off switch and associated pilot light are also usually provided so that the entire work station can be conveniently activated from a single control point.

There are three types of surge suppression devices or regulator devices commonly employed in low cost power line surge suppressor units. These types are (1) gas discharge tubes, (2) metal oxide varistors, and (3) silicon avalanche diodes. These devices have different operating characteristics and ratings and different failure or "wear out" characteristics. Some suppression units use two of these devices in a coordinated circuit to take advantage of the more desirable characteristics of each device. One useful combination of devices employs metal oxide varistors and silicon avalanche diodes. The metal oxide varistors provide the advantage of high surge energy and high current ratings at low cost, while the silicon avalanche diodes provide the advantage of low clamping voltage levels and extremely long life.

Regardless of the type of suppression devices employed, each type can fail if subjected to overloads which exceed its ratings. Furthermore, metal oxide varistors have a limited pulse life-time, which varies with the magnitude and number of transient pulses absorbed. The most common initial failure mode of both varistors and avalanche diodes is a short circuit condition. However, when such a transient suppression device is connected across a power line as a shunt regulator suppressor, a short circuit failure of the device will result in substantial a.c. current from the power line flowing through the device. The fault current will flow until a circuit breaker or fuse interrupts the current, or until the device absorbs so much energy that it melts, explodes or otherwise results in an open circuit. If the suppression device fails in this open circuit condition before the fuse or circuit breaker can operate, normal line voltage will continue to be applied to the user's equipment, but the transient protection will be lost. Thus, the user will not normally know that his equipment is without surge protection.

Since most transient suppression units, particularly those of the multiple outlet variety, will normally be connected to the a.c. power distribution system through circuit breakers that can supply enough energy to power all the outlets, and hence enough to blow open a short-circuit-failed suppression device, the likelihood of subsequent line surge damage to expensive equipment by such open-circuit failure of the regulator elements gives rise to a need for a transient suppression system which does not pose this danger. It is also possible that repeated resetting of the circuit breaker will eventually cause a short-circuit failed device to blow to an open circuit condition, whereupon the circuit breaker will remain closed, again allowing the user to operate his equipment unprotected.

To improve upon the situation described above, some manufacturers have included means to operate a warning lamp to indicate that a suppression device failure has occured. The lamp is activated by the blowing of a fast acting low current fuse which will open before enough energy has been delivered to the failed device to cause it to reach an open circuit condition. The lamp may signal the fault condition by lighting or extinguishing, depending upon the particular transient suppressor apparatus employed. The user, therefore, must constantly observe the condition of the lamp; however, since the transient suppression device is often placed on the floor under a desk, the lamp may not be readily visible.

It would be useful, therefore, to improve the prior art by providing a simple, relatively inexpensive automatic means for insuring the shutting off of power to the user's equipment in the event of suppression device failure, so that he cannot inadvertently operate his equipment without transient surge protection.

An additional useful feature would include provision such that a normally power-on indicating pilot lamp would be extinguished by the shut-down mechanism in the event of a suppression device failure, even if the circuit breaker remains closed after the failure, thereby indicating that no power is available at the sockets to which he connects his equipment.

SUMMARY OF THE INVENTION

According to a feature of the invention, a surge suppression circuit includes a thermal cutout inserted into one of a pair of power transmission lines between the input and output terminals thereof. A shunt suppressor network is connected through a fuse across the output terminals of the system. Across the fuse is connected a heater resistor in thermal contact with the thermal cut-out, so that upon short circuit failure in the suppressor network the fuse blows, causing the short-circuit current involved to flow through the heater resistor, which reduces this current to a value insufficient to drive the failed element to an open-circuit condition. However, this reduced current is still enough to heat the resistor sufficiently to raise the temperature of the thermal cut-out to its tripping or blowing point, causing it to assume a permanently open-circuit state, permanently shutting down the system until the short-circuited component is replaced. By this means the likelihood of unrecognized transient suppression loss by catastrophic failure of a suppressor network element in an open circuit condition is minimized.

According to a further feature of the invention, provision is made to eliminate "common mode" surge suppression in the form of simultaneous high voltage surges on the high and return lines of the system, the surge being returned via the earth grounding conductor of a three-wire system. A shunt varistor is similarly connected to blow the fuse upon short-circuit failure, while still serving before such failure to bypass such common mode surges. According to a related feature of the invention, a surge suppression network is incorporated into the earth ground conductor to assist in this common mode surge suppression.

By either of the foregoing means an additional measure of protection is achieved by the simple addition of a few additional relatively inexpensive components which are to be replaced at the same time the suppression network element is replaced when failure is detected. The resulting system is characterized by a substantial improvement in the measure of protection given to expensive equipment, which might otherwise suffer costly damage, at the cost of the inclusion of a few extra replaceable components.

DESCRIPTION OF DRAWINGS

The drawing is an electrical schematic diagram of the present invention.

DETAILED DESCRIPTION OF THE INVENTION

The drawing shows a circuit of an improved surge suppressing system designed to be plugged into wall mains by means of a conventional wall plug 1 to deliver output power to parallel connected outlet plugs 12, 12a, etc. Functionally the circuit is designed to be self-disabling in the event that the regulating devices, e.g. metal oxide varistors, silicon avalanche diodes, or similar shunt suppression network elements, fail by going into short circuit failure. The system further provides for a shutdown of the electrical power supplied to these devices, so as to prevent catastrophic open circuit suppression element failure which typically follows short circuit failure if such provision is not made. An output indicator light 13, which is normally on when the unit is functioning properly, extinguishes when the suppression system has failed and power is no longer available at the outlets 12-12a.

In more detail, power transfer between the input wall plug 1 and the output receptacles 12, 12a, etc. is achieved by power transfer along the "high" lines L1, L1', and the "return" lines L2 and L2' coupled between input terminals 1' and 1" of the wall plug 1 and output terminals 12' and 12" of the outlet receptacle or socket 12, as well as to additional parallel connected sockets, such as 12a. Plug 1 and the outlet receptacles 12-12a are preferably of the three-prong grounding variety, being coupled between ground terminals 1''' and 12''' by "neutral" earth grounding lines L3 and L3'. The circuit shown in the drawing may be incorporated into a flexible cord set, having a multiple outlet strip at the end, or may be an integral part of a small enclosure that houses only a single outlet socket and plugs directly into a wall outlet.

A circuit breaker 2 is included to limit the load current to a typical value such as 15 amperes so as to reduce the probability of overloading the local branch circuit of the power mains. This circuit breaker is preferably of the manual reset type. A power on-off switch 3 is also included in series with the circuit breaker 2 to control power to the receptacles 12-12a. A thermal cut-out switch 4 is connected to the output end of power switch 3. To indicate that power is available at the receptacle 12 a pilot lamp 13 is also connected across lines L1' and L2 through a suitable ballasting resistor 11. As will subsequently be discussed, when the surge suppression unit of the invention is in service and functioning properly, closure of the on-off switch 3 would cause the indicator lamp 13 to light up; whereas short circuit failure of the regulator will place the system in failure mode, such that the indicator lamp will extinguish in a minute or two thereafter, indicating to the user that line power is no longer being provided.

A transient voltage suppressor network is shown preferably including a metal oxide varistor 7, a silicon avalanche diode 9, a capacitor 10, and an inductor 8. Inductor 8 is inserted preferably between line L2 leading to the plug terminal 1" and line L2' leading to receptacle terminal 12". The varistor 7 and avalanche diode 9 are respectively connected to the plug and receptacle sides of the inductor 8 and have their remaining common terminals joined together. These common terminals are connected to one side of a parallel circuit consisting of a fuse 6 in parallel with a heater resistor 5 placed in thermal contact with the cut-out 4. The remaining terminals of the fuse and resistor are preferably connected to the high line L2' between the cut-out and the receptable pin 12'. The capacitor 10 is preferably connected across the output lines L1' and L2'.

It will be noted that an additional network is preferably used in the circuit, this network consisting of an inductor 8' inserted between the neutral line L3 connected to the neutral terminal 1''' of the plug 1 and a line L3' leading to neutral terminal 12''' of the sockets 12 and 12a. A second varistor 7', a second silicon avalanche diode 9' and a second capacitor 10' are also shown in the drawings. Additionally, a third varistor 7" is connected between the neutral pin 1''' and the junction of the fuse 6 and the varistor 7. These additional circuit elements are considered desirable in the preferred form of the invention for additional surge protection in "common mode", as will be discussed. For the present, however, insofar as the general surge suppression action of the system is concerned, the functioning of these components will not be discussed, since they are not central to the principal concept of the invention.

In normal operation, with fuse 6 intact and unblown, transient voltage suppression is secured by the shunt regulating action of the varistor 7 and avalanche diode 9 to shunt line power surges around and away from loads connected to the outlet receptacles 12-12a. Inductor 8 distributes the transient energy between these two devices in a manner dependent upon the waveform and duration of the transient voltage surge. Capacitor 10 works in conjunction with the inductance 8 to form a low-pass filter circuit that attenuates radio frequency noise voltage present in the power line so as to additionally help protect the load devices from this source of interference. The use of such components in similar and related networks for such purposes is well kown in the art.

As mentioned in the Background of Invention, when such varistors and avalanche diodes fail, their initial failure mode is usually a short-circuit condition. This is not in itself of great consequence; however, to act effectively as shunt regulators before they fail, they must clearly have the ability to handle substantial surge currents if they are to regulate effectively. This, in turn, normally implies that immediately upon short circuit failure a very heavy current must flow through such devices, quickly leading to a possible burnout to an open-circuit condition. At this point the suppression regulation is lost, and what is more important, the user is unaware that he has lost it. The present circuit overcomes this disadvantage by permanently disabling power transfer to the outlet loads when short-circuit failure occurs. This is accomplished by blowing of the fuse 6 immediately when either the varistor 7 or the diode 9 goes into short circuit failure. The means whereby this is accomplished will be next discussed.

The thermal cut-off device 4 is designed to permanently and irreversibly open the circuit when its temperature rises to a specified value, such as 100° C. The rating of fuse 6 is selected for the lowest value that will safely conduct the normal transient currents expected into the suppression network. A current rating of about 2 to 4 amperes will generally be adequate for transients likely to appear on a 120 volt a.c. power line.

Since the initial failure mode of the transient suppression devices is virtually always a short circuit, upon such failure a large current will flow through the fuse 6. Because the fuse 6 is selected to have a rating much less than the trip rating of the circuit breaker 2, and operates much more rapidly, it will blow before enough energy can be delivered to the failed varistor 7 or diode 9 to blow it to an open circuit condition. Moreover, as soon as the fuse blows, the current through the failed device will be limited to a relatively low value by the heater resistor 5, which may have a typical value of the order of 3,000 ohms. Thus, the short circuited device would receive a current of the order of 40 milliamperes, a value which a short circuited suppression device can conduct almost indefinitely without progressing to open-circuit failure. This current is sufficient, however, to cause a considerable power dissipation in the heater resistor 5 amounting to approximately 5 watts.

The heater resistor 5 is placed very close to the body of the thermal cut-out 4, the assembly being encapsulated preferably in a suitable potting compound such as epoxy. Thus, within a few minutes the heater resistor will have caused the thermal cut-out 4 to reach its actuating temperature, e.g. 100° C. whereupon it becomes permanently an open-circuit, thus shutting down the entire system.

At this point the indicator light 13 extinguishes, and the user is aware that system failure has occured, whereupon the normal procedure would be to detect the failed unit and replace it, along with the fuse 6 and the thermal cut-out 4. It is to facilitate such replacement that the entire suppression system is preferably configured as a unit subassembly which can be plugged into the system via plug-in terminals 14, 16, 18, and 20. As will be discussed, the second surge protection network is similarly incorporated into the subassembly, having plug-in terminals 22 and 24 associated therewith.

It is considered preferable that the thermal cut-out 4 and the fuse 6 be of the permanent blow-out type. The thermal cut-out 4 could be of the manual-reset type, or alternatively of the automatic bimetallic reset type; however, with the fuse 6 blown, virtually all surge suppression action in the network is lost because of the interposition of the heater resistor 5. As a result, expensive equipment deriving power from the system would be either temporarily or cyclically operating in a completely unprotected mode during those time intervals when the cut-out 4 is in a conducting mode. Similarly, the fuse 6 could be of the manual reset type; however, in such a case the user could accidentally power the failed suppression device from a short-circuit to an open-circuit condition, in which case the network would be thereafter inoperative to remove power line surges, again endangering associated equipment.

In the preferred form of the invention, it is further considered desirable that provision be made for providing surge protection against a particularly damaging form of transient which typically arises from lightning strikes on nearby power lines, this transient being know as "common mode" surging, and causing a simultaneous high voltage surge on both the high and return lines Ll and L2, the surge being returned via the earth ground conductor L3. This form of transient is particularly serious, since most electrical equipment which is sensitive to line surges at all is typically much more susceptible to common mode surge.

To this end, an additional surge suppression network is added to the earth conductor line L3, the network consisting of a series inductor 8' inserted into the earth conductor line, a varistor 7' connected between the plug side of inductor 8' and the receptable side of inductor 8, a silicon avalanche diode 9' connected between the receptacle side of inductor 8' and the receptacle side of inductor 8, and a bypass capacitor 10' connected across the avalanche diode 9'.

It will be noted that, since the normal operating potential across the varistor 7' is essentially zero, this element has a very low likelihood of failure. Failure in such elements is most typically encountered when they are forced to operate at substantial potentials and to bypass potential surges above a given threshold value therethrough.

Finally, a third varistor 7" is preferably connected between the juncture of varistor 7 and the fuse 6 and the plug side of the inductor 8'. This latter element, however, must operate at a nominal 110 volts a.c. across the terminals thereof, in a similar manner as must varistor 7; hence, this element must also be connected to trip the cut-out 4 if it should fail. It will be seen that failure of varistor 7" to a short-circuit condition will blow the fuse 6 in the same manner as will failure of varistor 7 or avalanche diode 9, resulting in similar system shutdown as before. The purpose of this second varistor 7" is to provide a better transient cut-off than is normally provided by the two silicon avalanche diodes 9 and 9' in series. Thus, by this means, the system is protected against both forms of commonly encountered line surges. In both cases those regulator elements which are prone to failure, and the failure of which to an open-circuit condition could cause the associated equipment to be unprotected, both actuate the system to complete shut-down in the event of failure.

Thus, the present invention achieves the desired object, namely providing system shut down immediately upon short circuit failure of the shunt regulating devices, while eliminating the possibility of a subsequent open circuit high current failure mode causing unnoticed failure of regulating action.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Thereof, it is intended that the broad aspect of the invention not be limited to a particular embodiment disclosed as the best mode comtemplated for carrying out the invention, but that the invention will include all embodiments falling within the scope of the appended claims.

Thus, for example, it will be noted that the upper terminal of the fuse 6 could alternatively be connected to the other side of the cut-out 4, since the short-circuit current is limited to low values insuficient to blow the regulator devices 7 and 9 to an open-circuit condition.

I claim:

1. In a power line surge suppressor having first and second input terminals for connection to high and low or return lines of electrical power mains, first and second output terminals for connection to loads to be protected, first and second load power conductor means coupled between said first input and output terminals and said second input and output terminals respectively for transfer of electrical power therebetween, and a first surge suppression means coupled across said first and second conductor means, said first surge suppression means having the property of presenting a reduced impedance to line voltage surges above a given threshold value so as to bypass surge currents through said first suppression means, the improvement comprising:

thermal cut-out means having a temperature-responsive switch means, said switch means being operable from a normally closed position to a circuit breaking condition when the temperature thereof exceeds a given threshold value, said switch means being inserted in series with one of said conductor means so as to terminate said power flow when in an open condition, and a resistance heating element in thermal contact with said switch means;

electrical current interrupting fuse means coupled to said first surge suppression means so that said bypass surge currents pass through said fuse means, said fuse means having a blowout value chosen to withstand said bypass surges and to blow only at current values corresponding to a short circuit failure condition in said first surge suppression means, said resistance element being connected in parallel to said fuse means so that upon blowing of said fuse means the current thereafter flowing through said resistance element heats said element to open said switch means.

2. The surge suppressor of claim 1 further including indicator lamp means connected across said output terminals to indicate a power-available condition thereat.

3. The surge suppressor of claim 1 further including a power switch and a current-sensing circuit breaker inserted in series with the input end of one of said conductor means.

4. The surge suppressor of claim 1 wherein said first surge suppression means includes a first varistor, said first varistor and said fuse means being connected in series across said first and second conductor means.

5. The surge suppressor of claim 1 wherein said first surge suppression means includes a first avalanche diode, said first diode and said fuse means being connected in series across said first and second conductor means.

6. The surge suppressor of claim 1 wherein said first surge suppression means includes a first varistor and a first avalanche diode, said fuse means is connected at one terminal thereof to one of said conductor means and at the other terminal thereof to one terminal of said first varistor and one terminal of said first diode, the other terminals of said first varistor and first diode being connected to the other of said conductor means.

7. The surge suppressor of claim 6 further including an inductor coupled between said input and output terminals coupled by said other conductor means, said other terminal of said first diode being connected to the output terminal end of said inductor, said other terminal of said first varistor being connected to the input terminal end of said inductor.

8. The surge suppressor of claim 7 further including a capacitor connected in parallel across said first diode.

9. The surge suppressor of claim 7 wherein said switch means is connected in series between the input and output terminals coupled by said one conductor means.

10. The surge suppressor of claim 7 wherein at least said cut-out, said fuse means, and said resistance heating element are part of a plug-in assembly, and there is provided plug-in terminal means for allowing plug-in insertion and withdrawal of said plug-in assembly from the rest of the circuit.

11. The surge suppressor of claim 10 wherein said plug-in assembly further includes at least one of said first varistor and said first diode.

12. The surge suppressor of claim 10 wherein said plug-in assembly further includes said first varistor and said first diode.

13. The surge suppressor of claim 1 wherein at least said switch means, said resistance heating element, at least part of said first network, and said fuse means are part of a plug-in assembly, and there is provided plug-in terminal means for allowing plug-in insertion and withdrawal of said plug-in assembly from the rest of the circuit.

14. The surge suppressor of claim 1 further comprising an earth input terminal, an earth output terminal, third conductor means coupled between said earth input and output terminals for coupling power mains earth ground, and a second surge suppression means coupled between said third conductor means and said return line, said second suppression means having the property of presenting a reduced impedance to line voltage surges above a given threshold value so as to bypass surge currents through said second surge suppression means.

15. The surge suppressor of claim 1 further comprising an earth input terminal, an earth output terminal, third conductor means coupled between said earth input and output terminals for coupling power mains earth ground, and a third surge suppression means coupled between the side of said fuse means connected to said first surge suppression means and said earth input terminal, said third suppression means having the property of presenting a reduced impedance to line voltage surges above a given threshold value so as to bypass surge currents through said third suppression means.

16. The surge suppressor of claim 14 further comprising an earth input terminal, an earth output terminal, third conductor means coupled between said earth input and output terminals for coupling power mains earth ground, and a third surge suppression means coupled between the side of said fuse means connected to said first surge suppression means and said earth input terminal, said third suppression means having the property of presenting a reduced impedance to line voltage surges above a given threshold value so as to bypass surge currents through said third suppression means so that a short circuit therein will blow said fuse means.

17. The suppressor of claim 14 wherein said second surge suppression means includes a varistor.

18. The suppressor of claims 14 or 15 wherein said third suppression means includes a varistor.

19. The surge suppressor of claim 1 wherein said switch means is connected in series between the input terminal connected to the high side of the electrical mains and said first output terminal, said first surge suppression means comprises a first inductor connected in series between the other or low input terminal and said second output terminal, a first varistor connected at one end to the input terminal end of said first inductor, a first avalanche diode connected at one end to the output terminal end of said first inductor, the other ends of said first varistor and first diode being connected together at a first node, said fuse means and said resistance element being connected in parallel between said first node and the output end of said switch means.

20. The surge suppressor of claim 19 further comprising an earth input terminal, an earth output terminal, third conductor means coupled between said earth input and output terminals for coupling power mains earth ground, wherein there is provided a second suppression means comprising a second varistor connected between said first node and said earth input terminal.

21. The surge suppressor of claim 20 wherein there is provided a third suppression network comprising a second inductor connected in series between said earth input and output terminals, a third varistor connected between the input end of said second inductor and the output end of said first inductor, and a second avalanche diode connected in parallel between the output ends of said first and second inductors.

22. The surge suppressor of claim 21 wherein at least said cut-out, said fuse, said resistor, said first varistor, said second varistor, said third varistor, said first diode, and said second diode form part of a plug-in assembly, and there is provided plug-in terminal means for allowing plug-in insertion or withdrawal of said plug-in assembly from the rest of the circuit.

23. In a power line surge suppressor having first and second input terminals for connection to a source of electrical power and first and second output terminals for connection to loads to be protected, a pair of power conductor means coupled between said first input and output terminals and said second input and output terminals respectively for transfer of electrical power therebetween, normally conducting circuit breaking means coupled between at least one of said input terminals and at least one of said output terminals for maintaining or permanently breaking load power delivery therebetween, and a shunt surge suppression means connected across said pair of conductor means, said surge suppression means having the property of presenting a reduced impedance to line voltage surges above a given threshold value so as to shuntingly bypass potentially load-damaging surge currents through said surge suppression means and away from said loads without permanently disconnecting power from the load, the improvement comprising: means unresponsive to said surge currents and responsive to a short circuit failure of said surge suppression means resulting in a current capable if sustained of permanently damaging said surge suppression means, resulting in an open-circuit blowout non-shunting condition, for reducing the current flowing in said surge suppression means to a lower safe value; and means responsive to the flow of current in said surge suppressor means at said lower safe value for actuating said circuit breaking means to permanently break power delivery to said output terminals.

24. The surge suppressor of claim 23 further including indicator means connected across said output terminals to indicate a power-available condition thereat.

* * * * *